United States Patent
Acker, Jr.

(10) Patent No.: US 7,325,748 B2
(45) Date of Patent: Feb. 5, 2008

(54) VENTILATION SYSTEM WITH HUMIDITY RESPONSIVE VENTILATION CONTROLLER

(75) Inventor: Phillip F. Acker, Jr., 505 Edinburgh St., San Mateo, CA (US) 94402

(73) Assignee: Phillip F. Acker, Jr., San Mateo, CA (US)

( * ) Notice: Subject to any disclaimer, the term of this patent is extended or adjusted under 35 U.S.C. 154(b) by 293 days.

(21) Appl. No.: 11/187,788

(22) Filed: Jul. 22, 2005

(65) Prior Publication Data
US 2005/0252983 A1    Nov. 17, 2005

Related U.S. Application Data

(63) Continuation-in-part of application No. 10/653,065, filed on Sep. 3, 2003, now Pat. No. 6,935,570.

(60) Provisional application No. 60/407,677, filed on Sep. 3, 2002.

(51) Int. Cl.
*G05D 22/02* (2006.01)

(52) U.S. Cl. ............. 236/44 A; 165/222; 236/46 R
(58) Field of Classification Search .... 236/44 R–44 A, 236/46 R; 165/222–223, 270
See application file for complete search history.

(56) References Cited

U.S. PATENT DOCUMENTS

| | | | | |
|---|---|---|---|---|
| 4,251,026 A | * | 2/1981 | Siegel et al. | 236/49.3 |
| 4,953,784 A | * | 9/1990 | Yasufuku et al. | 236/44 A |
| 5,253,804 A | * | 10/1993 | Sarazen et al. | 236/44 C |
| 5,450,893 A | * | 9/1995 | Galba et al. | 165/229 |
| 5,810,244 A | * | 9/1998 | Ngai | 236/44 C |
| 6,793,146 B2 | * | 9/2004 | Cunkelman et al. | 236/44 A |
| 7,281,669 B2 | * | 10/2007 | Neuefeind et al. | 236/44 C |

* cited by examiner

*Primary Examiner*—William E. Tapolcai
(74) *Attorney, Agent, or Firm*—Martine Penilla & Gencarella, LLP

(57) ABSTRACT

A method of controlling ventilation including determining a current gradient, comparing the current gradient to a threshold and activating a device coupled to a ventilation controller if the current gradient is greater than or equal to the threshold.

22 Claims, 11 Drawing Sheets

VENTILATION SYSTEM WITH HUMIDITY RESPONSIVE VENTILATION CONTROLLER

CROSS REFERENCE TO RELATED APPLICATIONS

This application is a continuation-in-part of and claims priority from U.S. patent application Ser. No. 10/653,065 filed on Sep. 3, 2003, now U.S. Pat. No. 6,935,570, and entitled "Ventilation System with Humidity Responsive Ventilation Controller," which is incorporated herein by reference in its entirety and which claims priority from U.S. Provisional Patent Application No. 60/407,677 filed on Sep. 3, 2002 and entitled "Ventilation System with Humidity Responsive Ventilation Controller," which is also incorporated herein by reference in its entirety.

BACKGROUND

The present invention relates generally to a ventilation system with an environmental controller. More particularly, this invention relates to systems and methods for reducing or preventing humidity.

Enclosed spaces such as a room, particularly a bathroom, with poor ventilation can be regularly subjected to humid conditions. Under such conditions, moist air can have difficulty exiting the room, resulting in condensation or dewing on the room's surfaces. Moisture, in general, can lead to mold growth. Mold has been known to cause serious illness and extensive property damage.

Typically, rooms subject to high humidity contain ventilation systems that use an exhaust fan to expel the humid air from the room to the atmosphere, but these systems have known deficiencies. First, most ventilation systems are limited by their dependence on human operators to manually actuate a power switch. However, people often forget to activate the switch, especially before it is needed. Therefore, high moisture conditions exist by the time the system is activated, if it ever is.

A second type of ventilation system operates by activating the exhaust fan when the room's lights are turned on. These ventilation systems are uneconomical because they always activate the fan, even during non-humid conditions. Besides increased power usage, these systems needlessly expel conditioned air (heated or cooled) from the room. Other problems include users shutting off the lights before the excess moisture has been fully removed from the room, or they may never turn on the room's lights to begin with.

Other ventilation systems employ timers to activate and deactivate the ventilation system. These systems are also wasteful if they continue to run after the moisture in the air has already been expelled. On the other hand, timed systems may not run long enough to fully dehumidify the room. Basically, these ventilation systems are ineffective and wasteful because they are not automated. They also do not ensure that moisture will be adequately removed from a room.

Improvements to known ventilation systems have been made in an effort to increase system automation and effectiveness. Humidity sensors are now used to detect high humidity conditions so that a ventilation system activates once a room's humidity exceeds a preset value. These settings are often predefined and may not apply to the environmental conditions for various geographical areas. Moreover, the humidity inside a building varies throughout the course of a day with temperature fluctuations, as well as during different seasons of the year. As a result, it is possible the device will perform poorly because the operating parameters, such as geographical and seasonal changes, were not accounted for.

Another effort to automate ventilation systems for humid environments includes a device using one sensor to monitor a room's humidity and circuitry to calculate average humidity over a given period of time in order to form a reference value. If the measured humidity exceeds this reference value by a predetermined amount, a ventilation controller activates an exhaust fan. A drawback to this method is that environmental humidity can fluctuate as the temperature changes each day, causing the ambient humidity to exceed the reference value. As a result, the fan may fail to operate when it is needed or may operate needlessly.

In view of the foregoing, a need exists for systems and methods of controlling humidity that is fully automated, economical, and effective.

SUMMARY

Broadly speaking, the present invention fills these needs by providing improved systems and methods for controlling humidity. It should be appreciated that the present invention can be implemented in numerous ways, including as a process, an apparatus, a system, computer readable media, or a device. Several inventive embodiments of the present invention are described below.

In accordance with the present invention, a ventilation system is provided that incorporates a ventilation controller constructed to be mounted inside, or in place of, a standard electrical junction box, wherein the ventilation controller activates and deactivates an exhaust fan, as needed, to reduce humidity. The ventilation system incorporates at least one humidity sensor in wired or wireless communication with the ventilation controller. The ventilation controller preferably incorporates an integrated circuit providing logic controls, although it may incorporate a mechanical humidity controller as known in the art. Generally, the ventilation controller is usable to maintain a satisfactory humidity level and to prevent, or reduce, mold growth. Importantly, it acts to prevent condensation and dewing in a fully automated manner.

The ventilation controller can be constructed to operate in a number of ways. In one embodiment, a single humidity sensor sends data to the ventilation controller, and the ventilation controller switches on power to the fan when the humidity is determined to have exceeded a value that is manually specified by a user. A potentiometer or other adjustable controller, including a ribbon in a mechanical humidity controller, can be used to set a preferred value. In another preferred embodiment, a single sensor operates with the integrated circuit to detect rapidly increasing humidity. In yet another embodiment, one or more humidity sensors monitor a room's humidity level while one or more additional reference sensor(s) measures humidity in a nearby room in order to provide a reference value. In this third embodiment, the ventilation controller provides power to the exhaust fan only when the humidity at the first sensor exceeds the humidity at the reference sensors. The various embodiments, as more fully defined below, could also be used in combination. For example, the adjustable controller may be used to set the value at which the ventilation controller should activate the exhaust fan, as in the first embodiment, but the controller would only do so if the sensed humidity were higher than the humidity at a reference sensor, as in the third embodiment. A temperature sensor may also be employed in conjunction with a humidity sensor in order to obtain a more accurate humidity value.

The ventilation controller is specifically constructed so as to mount within, or in place of, a standard electrical junction box, such as a light switch box. Therefore, it is retrofittable to existing ventilation systems. Existing wiring for an electrical junction box is usable to power the controller, and the controller is also in electrical connection with the exhaust fan and/or the room's lights. The ventilation system of the present invention also provides the ability for sensors to be remotely located from the ventilation controller. These remote sensors communicate with the ventilation controller through either wired or wireless communication means. Additional features, such as a heat source to prevent condensation on the humidity sensor or within the ventilation controller or a manual exhaust fan switch that bypasses the ventilation controller, are discussed below.

One embodiment provides a method of controlling ventilation including determining a current gradient, comparing the current gradient to a threshold and activating a device coupled to a ventilation controller if the current gradient is greater than or equal to the threshold.

The ventilation controller can include a housing that includes a circuit for electrically connecting a power source to the ventilation controller, at least one switch in the housing and at least one humidity sensor in communication with, and providing data to, the ventilation controller. The ventilation controller can include at least one of a display, an electrical receptacle, a speaker, a motion detector, a light or a fragrance dispenser.

The device can include at least one of a fan or a light. Determining a current gradient can include receiving a first humidity level, waiting a first time delay, receiving a second humidity level and calculating a first gradient equal to a first humidity difference divided by the first time delay. The first humidity difference can be a difference between the second humidity level and the first humidity level.

The current gradient can be equal to the first gradient. Determining the current gradient can also include comparing the first gradient to a first threshold. Determining the current gradient can also include waiting a second time delay from receiving the second humidity level, receiving a third humidity level and calculating a second gradient equal to a second humidity difference divided by the second time delay. The second humidity difference can be a difference between the third humidity level and the second humidity level. Comparing the first gradient to the first threshold can also include comparing the second gradient to a second threshold if the first gradient is greater than or equal to the first threshold.

Determining a current gradient can also include receiving a third humidity level, waiting a third time delay, receiving a fourth humidity level and calculating a third gradient equal to a third humidity difference divided by the third time delay. The third humidity difference can be a difference between the fourth humidity level and the third humidity level. Comparing the first gradient to the first threshold can include comparing the third gradient to a second threshold if the first gradient is greater than or equal to the first threshold.

The threshold can include a pre-selected threshold. The threshold can include retrieving multiple recorded humidity levels over a time interval. The time interval can include multiple time intervals and wherein the multiple recorded humidity levels includes retrieving multiple recorded humidity levels in each of the multiple time intervals. Determining an average humidity level can include constructing a humidity profile.

Comparing the current gradient to the threshold can include determining an average humidity level. The threshold can be equal to the average humidity level. Comparing the current gradient to the threshold can include determining the threshold from at least one of a linear curve, non-linear curve, piecewise linear curve, piecewise non-linear curve, or a combination of a linear curve and non-linear curve.

The device can also be deactivated. Deactivating the device can include waiting a fourth time delay and interrupting power to the device. Deactivating the device can include waiting a fifth time delay, receiving a first shutdown humidity level, waiting a sixth time delay, receiving a second shutdown humidity level, determining a shutdown gradient, comparing the shutdown gradient to a shutdown threshold and interrupting power to the device if the shutdown gradient is less than the shutdown threshold. The shutdown gradient can be equal to a first shutdown humidity difference divided by the sixth time delay. The first shutdown humidity difference can be a difference between the second shutdown humidity level and the first shutdown humidity level.

Another embodiment provides a method of controlling ventilation. A first humidity level is received, waiting a first time delay, receiving a second humidity level, calculating a first gradient equal to a first humidity difference divided by the first time delay. The first humidity difference can be a difference between the second humidity level and the first humidity level. A third humidity level is received, waiting a second time delay, receiving a fourth humidity level and calculating a second gradient equal to a second humidity difference divided by the second time delay. The second humidity difference can be a difference between the fourth humidity level and the third humidity level. The first gradient is compared to a first threshold and the second gradient is compared to a second threshold if the first gradient is greater than or equal to the first threshold. If the second gradient is greater than or equal to the second threshold, a device is activated. The device being coupled to the ventilation controller.

Yet another embodiment provides a ventilation system including a ventilation controller contained within a housing. The ventilation controller including a first humidity sensor being exposed to at least one external surface of the housing. The ventilation system also includes an exhaust fan coupled to the ventilation controller. The ventilation controller also includes logic for determining a current gradient, logic for comparing the current gradient to a threshold and logic for activating the exhaust fan if the current gradient is greater than or equal to the threshold. The system also includes at least one switch, the at least one switch including a manual switch, the manual switch being operable to bypass the ventilation controller.

The logic for determining a current gradient can include logic for receiving a first humidity level, logic for waiting a first time delay, logic for receiving a second humidity level and logic for calculating a first gradient equal to a first humidity difference divided by the first time delay. The first humidity difference can be a difference between the second humidity level and the first humidity level.

The current gradient can be equal to the first gradient. The logic for determining the current gradient can also include logic for comparing the first gradient to a first threshold.

The logic for determining the current gradient can also include logic for waiting a second time delay from receiving the second humidity level, logic for receiving a third humidity level and logic for calculating a second gradient equal to a second humidity difference divided by the second time delay. The second humidity difference can be a difference between the third humidity level and the second humidity level.

The logic for comparing the first gradient to the first threshold can also include logic for comparing the second gradient to a second threshold if the first gradient is greater than or equal to the first threshold. The logic for determining a current gradient can also include logic for receiving a third humidity level, logic for waiting a third time delay, logic for receiving a fourth humidity level and logic for calculating a third gradient equal to a third humidity difference divided by the third time delay. The third humidity difference can be a difference between the fourth humidity level and the third humidity level. The logic for comparing the first gradient to the first threshold can include logic for comparing the third gradient to a second threshold if the first gradient is greater than or equal to the first threshold.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for improved systems and methods for controlling humidity will now be described. It will be apparent to those skilled in the art that the present invention may be practiced without some or all of the specific details set forth herein.

The improved systems and methods for controlling humidity described herein can include an exhaust fan that is automatically activated when the humidity level in a room increases above a control point. The control point can be automatically obtained or can be manually selected by a user. In this manner, a user could account for the particular conditions of their locale.

The improved systems and methods for controlling humidity described herein can also include a ventilation system wherein a ventilation controller activates an exhaust fan when rapidly increasing humidity is detected. The ventilation system can also include a ventilation controller that activates an exhaust fan when the humidity in a room exceeds the humidity in nearby rooms. The above-described improvements could also be used in combination with each other could include the use of wireless technology. For example, humidity sensors used to monitor the humidity in a room could communicate with the ventilation controller without a wired connection.

An improved ventilation controller could automatically activate and deactivate an exhaust fan, as needed. Such an improved ventilation controller can be mounted inside, or in place of, a standard electrical junction box such as one containing light switches. In this manner the improved ventilation controller can be easily retrofitted to existing ventilation systems. The ventilation system in accordance with the present invention provides such a ventilation controller, and it overcomes the deficiencies that have prevented the development of a satisfactory ventilation controller.

Figure 1:
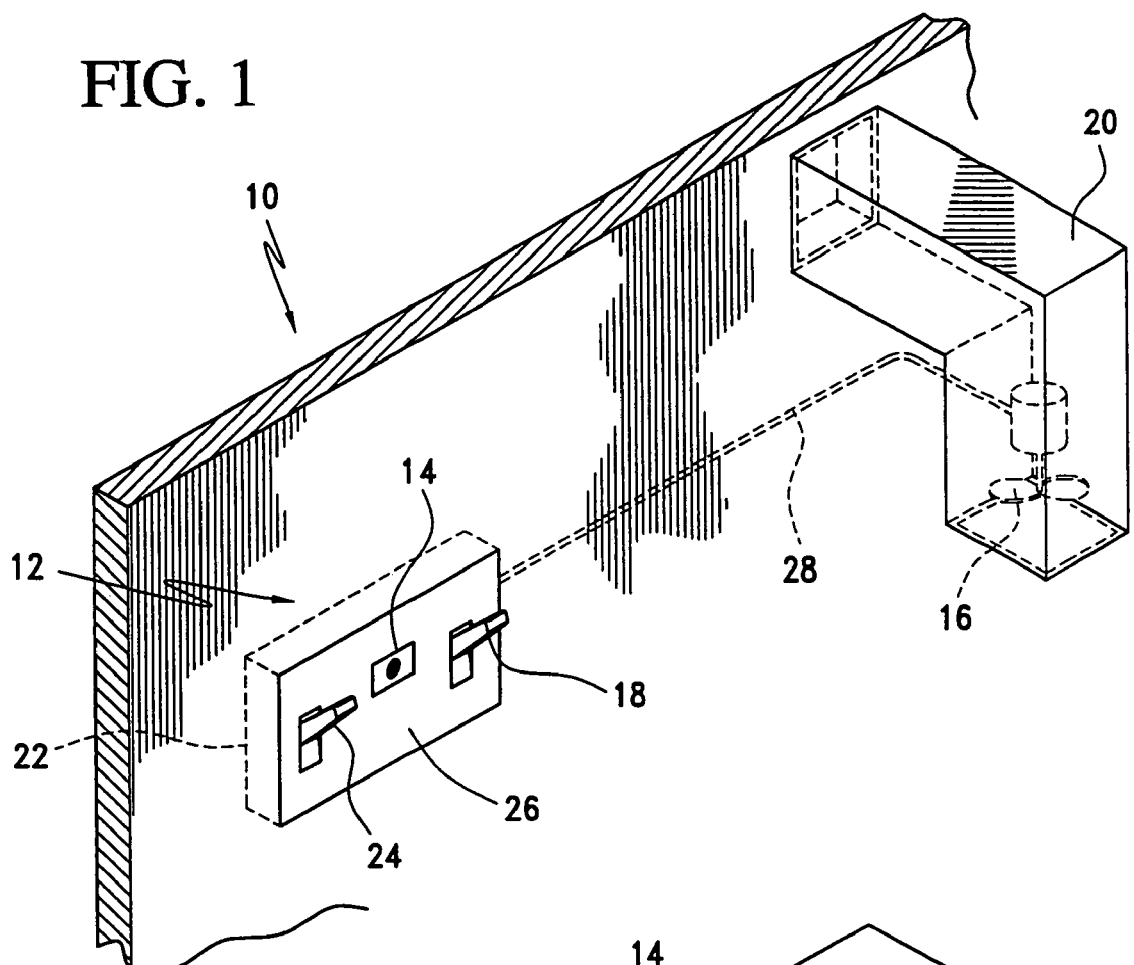
FIG. 1 illustrates a ventilation system, in accordance with one embodiment of the present invention.

FIG. 1 illustrates a ventilation system 10, in accordance with one embodiment of the present invention. A ventilation controller 12 incorporates a single humidity sensor 14. Ventilation controller 12 is connected to switch on power to an exhaust fan 16 and it may include a manual fan switch 18, which, if included, activates exhaust fan 16 directly, bypassing controller 12. The manual fan switch could operate the fan indefinitely or for a set period of time. Manual fan switch 18 could also operate a fan until the controller determines, by the circuitry described below, that the room is no longer humid. A user could deactivate the fan by way of manual fan switch 18 or a reset button (not shown). Exhaust fan 16 expels the room's air through an exhaust duct 20 or wall opening in a known manner.

Ventilation controller 12 is assembled in a housing 22 that is sized and dimensioned so that it can be mounted in, or in place of, a standard electrical junction box. Moreover, housing 22 includes a standard light switch 24 with an optional manual fan switch 18 and a light switch faceplate 26. Housing 22 is also constructed so that ventilation controller 12 can be connected to standard building electrical wiring (not shown). As such, it is retrofittable to an existing exhaust system by replacing a standard light switch housing or other junction box.

Ventilation system 10 can be installed in new or existing structures, and the ventilation controller 12 can be newly installed or can replace the light and/or fan switches in an existing ventilation system. In either case, an electrical cable 28 leads from ventilation controller 12 to exhaust fan 16, providing the fan with a power connection. Under the proper conditions, ventilation controller 12 switches on the power to exhaust fan 16 in order to automatically reduce or prevent humid conditions in a room.

Figure 2:
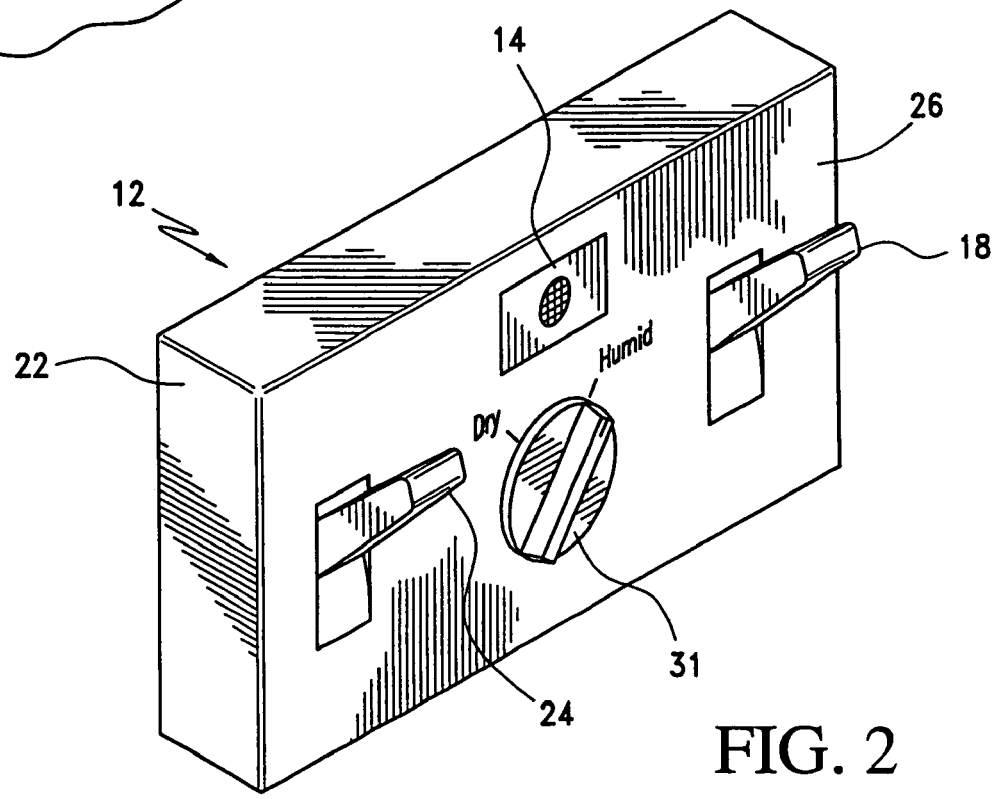
FIG. 2 is a more detailed view of the ventilation controller, in accordance with one embodiment of the present invention.
Figure 3:
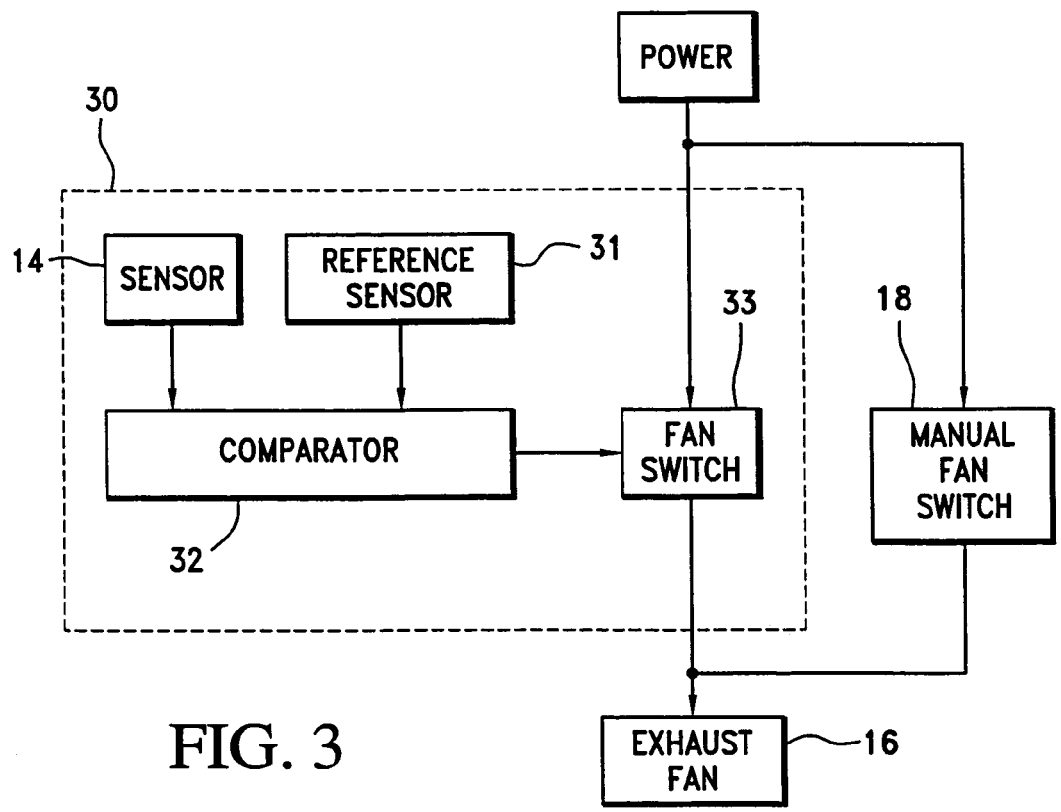
FIG. 3 is a block diagram of the ventilation system, in accordance with one embodiment of the present invention.

The present invention improves upon prior ventilation systems in a number of ways. FIG. 2 is a more detailed view of the ventilation controller 12, in accordance with one embodiment of the present invention. FIG. 3 is a block diagram of the ventilation system 10, in accordance with one embodiment of the present invention. As illustrated by FIGS. 2 and 3, at least one humidity sensor 14 monitors the humidity in a room and provides data to an integrated circuit 30 in ventilation controller 12. Integrated circuit (IC) 30 receives data from humidity sensor 14 and activates exhaust fan 16 when the humidity is determined to exceed a set value. Importantly, the exact value at which point the controller would activate the fan can be manually adjusted by the user by means of a knob 31 (see FIG. 2) that is connected to a potentiometer (not shown) or other adjustable controller.

A measured humidity value or humidity level from humidity sensor 14 and a user-defined value as determined by the adjustment of knob 31 are sent to comparator 32. When the room's humidity exceeds the value set by the user, the comparator sends a control signal to an electric fan switch 33 that enables electric fan switch 33 to provide power to exhaust fan 16. When the room's humidity is determined by comparator 32 to have returned to a preset level, both below or near the user set value, electric fan switch 33 is open and no power is sent to exhaust fan 16. The ability to adjust the value allows a user to tune ventilation system 10 based on varying geographical and seasonal conditions. The user can adjust the controller so that the set value exceeds ambient conditions, preventing the fan from being activated needlessly. The manual adjustment also allows ventilation controller 12 to be attuned to a user's preferences.

Figure 4:
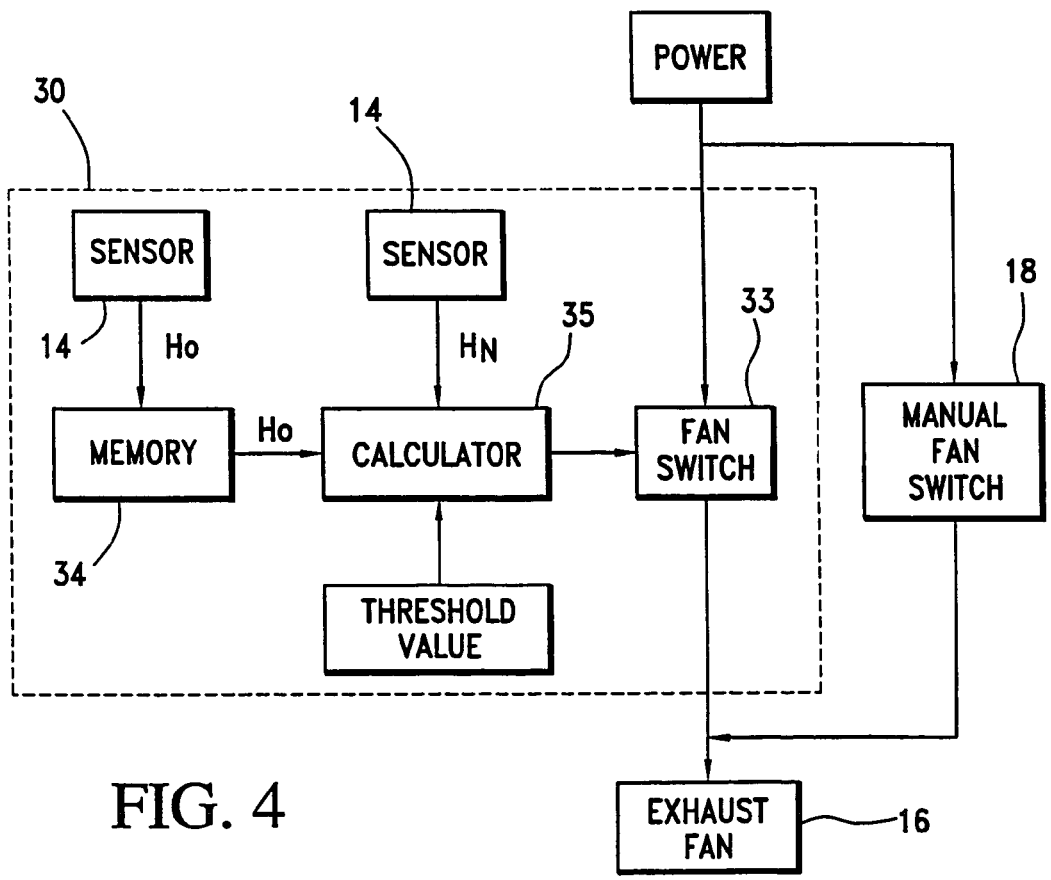
FIG. 4 is a block diagram of the ventilation system, in accordance with one embodiment of the present invention.

In a second preferred embodiment wherein only one humidity sensor is used to monitor a room's humidity, IC 30 calculates a gradient, or rate of change, of the room's humidity using different control logic. Gradient is defined, herein, as:

Gradient=$(H_t-H_o)/t$, where $H_t$=measured humidity at time t $H_o$=initial starting humidity at t=0 and t=a unit of time FIG. 4 is a block diagram of the ventilation system 10, in accordance with one embodiment of the present invention.

As illustrated in FIG. 4, humidity sensor 14 provides an initial value Ho that is stored in memory 34. After a period of time, determined by the predefined value of 't', humidity sensor 14 provides a value Ht to calculator 35. Calculator 35 extracts value Ho from memory 34 in order to calculate a gradient value using the equation above. The calculator also compares the gradient value to a predetermined threshold value. If the resulting gradient value exceeds a predetermined threshold value, calculator 35 provides a signal to electric fan switch 33, which in turn activates exhaust fan 16. The fan continues to operate until calculator 35 determines that value Ht, provided every 't' units of time, is about, or is less than, value Ho, as stored in memory 34. At that point, memory 34 is cleared and the process repeats. It is possible to include a timer, reset button, or some other known method for deactivating exhaust fan 16. If calculator 35 determines the calculated gradient value does not exceed the predetermined threshold value, a new humidity value is stored as Ho and the above method is repeated. A reset button (not shown) may also clear memory 34 and shut off the exhaust fan.

Figure 5:
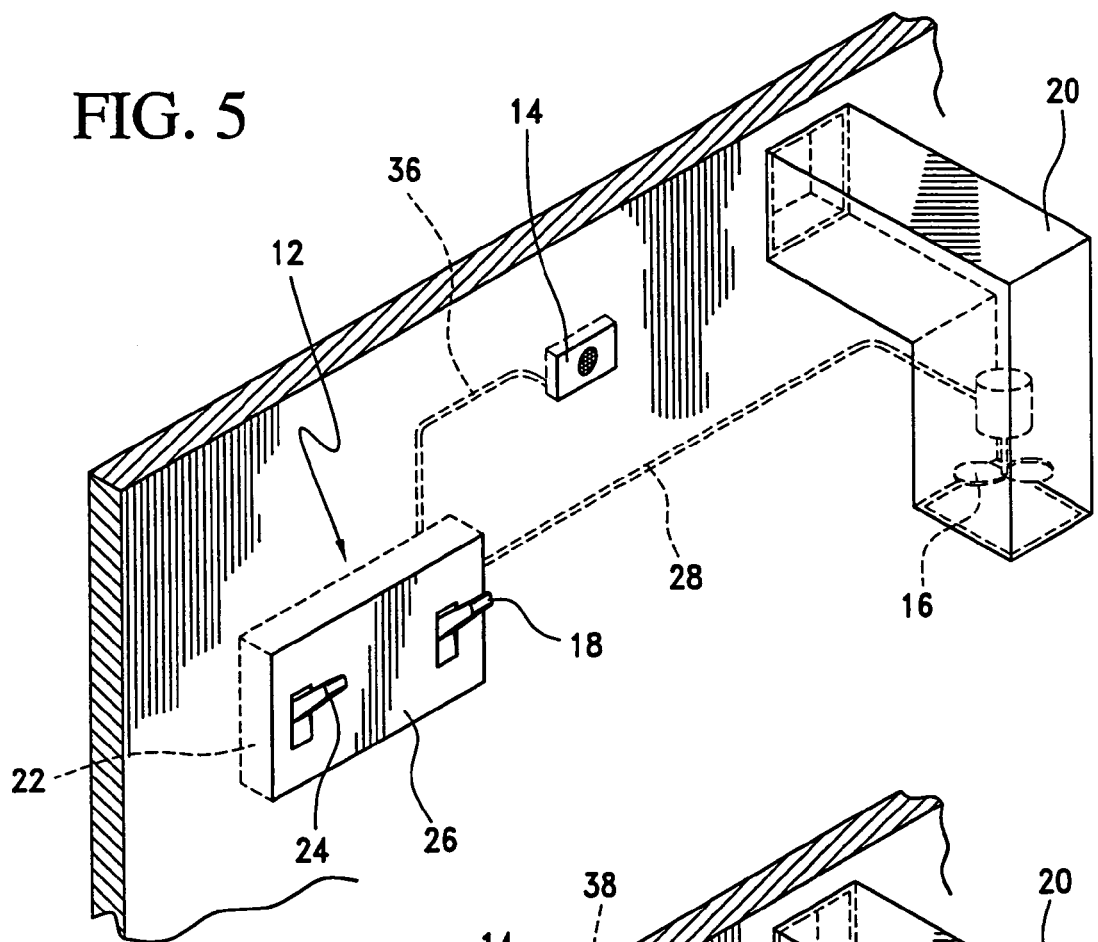
FIG. 5 illustrates a ventilation system with a remote humidity sensor, in accordance with one embodiment of the present invention.

In certain circumstances, it would be advantageous to locate the single humidity sensor 14 in the above embodiments remotely from ventilation controller 12. FIG. 5 illustrates a ventilation system 10 with a remote humidity sensor 14, in accordance with one embodiment of the present invention. A sensor wire 36 provides communication between humidity sensor 14 and ventilation controller 12.

Figure 6:
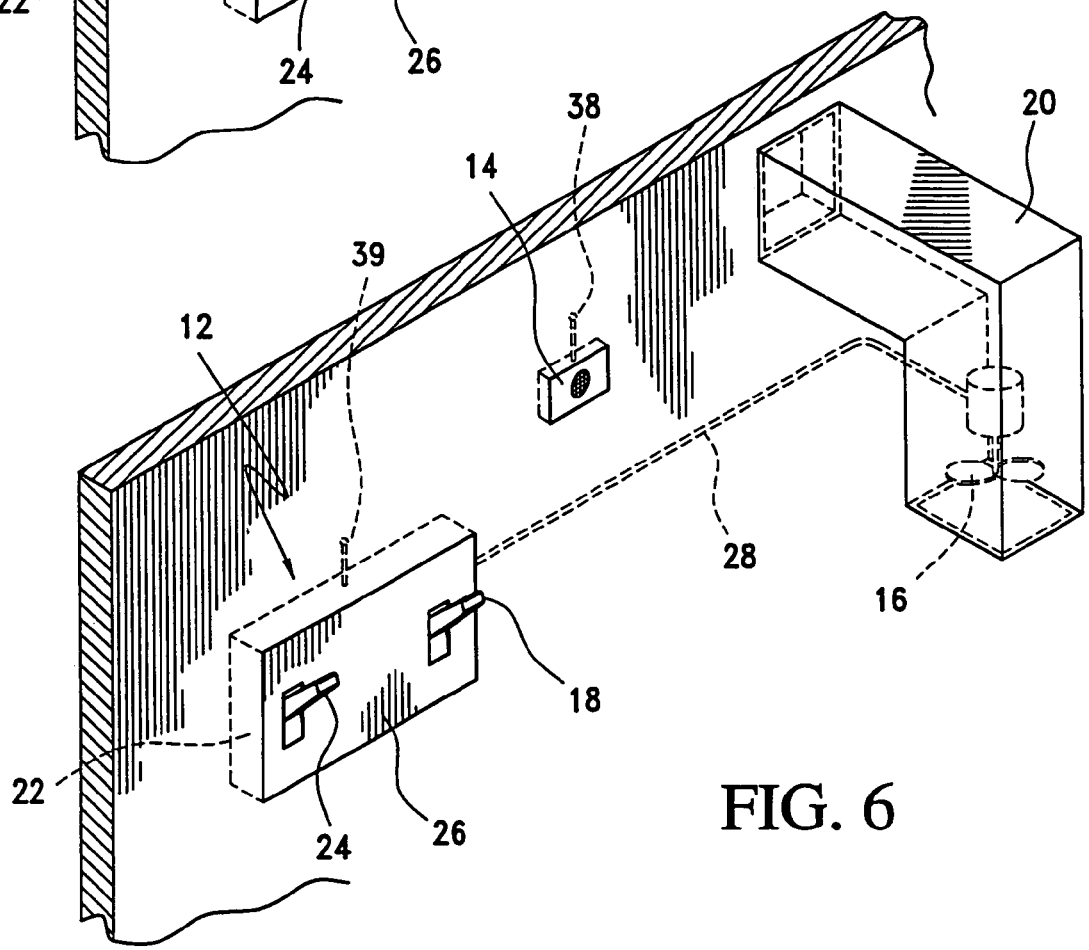
FIG. 6 illustrates a ventilation system with a remote humidity sensor, in accordance with one embodiment of the present invention.

FIG. 6 illustrates a ventilation system 10 with a remote humidity sensor 14, in accordance with one embodiment of the present invention. The sensor 14 has a wireless transmitter 38 and ventilation controller 12 has a wireless receiver 39. In this manner, humidity sensor 14 could be placed in any type of housing (not shown), including a smoke detector, carbon monoxide detector, or the like, that could attach to a wall or ceiling in the room to be monitored. For example, in a bathroom, it would be advantageous to place the humidity sensor proximate to a shower stall or bathtub in a bathroom. This would allow humidity sensor 14 to more quickly register a change in humidity due to the user bathing than if it were located across the room adjacent a light switch. It is also easier to install a remote sensor that can wirelessly communicate with ventilation controller 12. Regardless of remote sensor is wired to ventilation controller 12 or in wireless communication therewith, the controller could activate the fan under the adjustable value and/or rate of change embodiments explained above.

Figure 7:
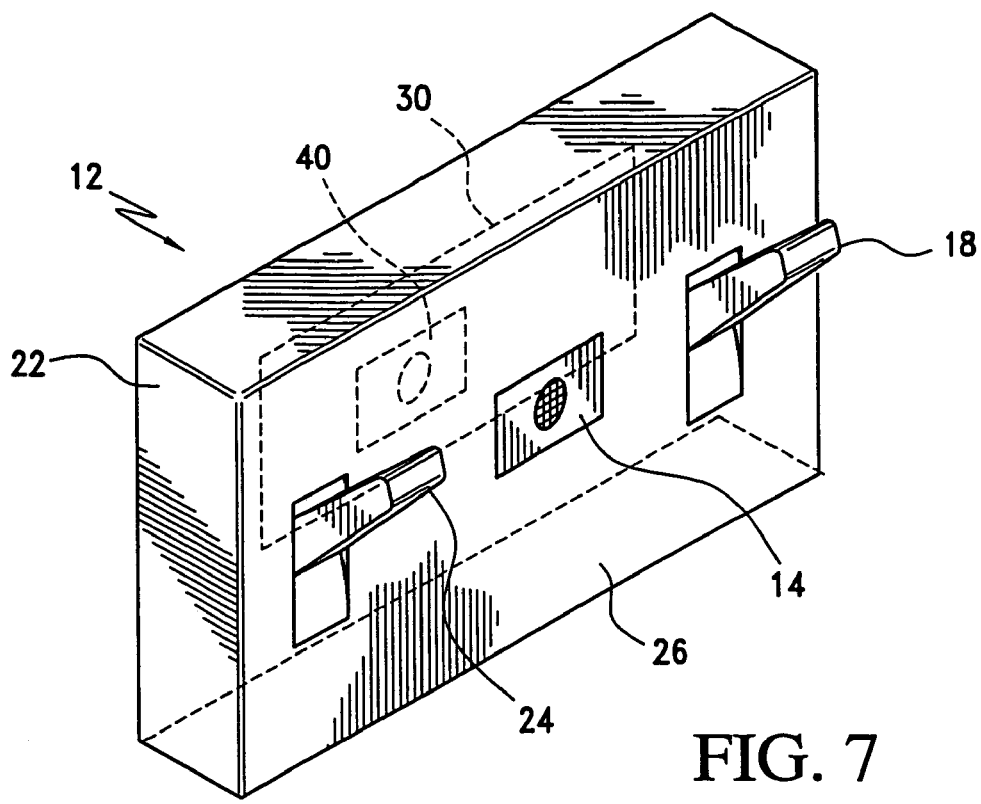
FIG. 7 illustrates a ventilation controller coupled to multiple humidity sensors in accordance with one embodiment of the present invention.

FIG. 7 illustrates a ventilation controller 12 coupled to multiple humidity sensors 14, 40, in accordance with one embodiment of the present invention. The first humidity sensor 14 monitors the humidity conditions in a first room while at least one reference sensor 40 is located at reference point. As illustrated in FIG. 5, reference sensor 40 can be located within ventilation controller 12. This would place reference sensor 40 within the wall space bordering the room being monitored. In practice, humidity sensor 14 and a reference sensor 40 supply signals "H" and "H*r", respectively, to an integrated circuit 30. Ventilation controller 12 activates power to exhaust fan 16 when H exceeds H*r by a predetermined amount. The fan is deactivated when H falls below the reference signal H*r.

Figure 8:
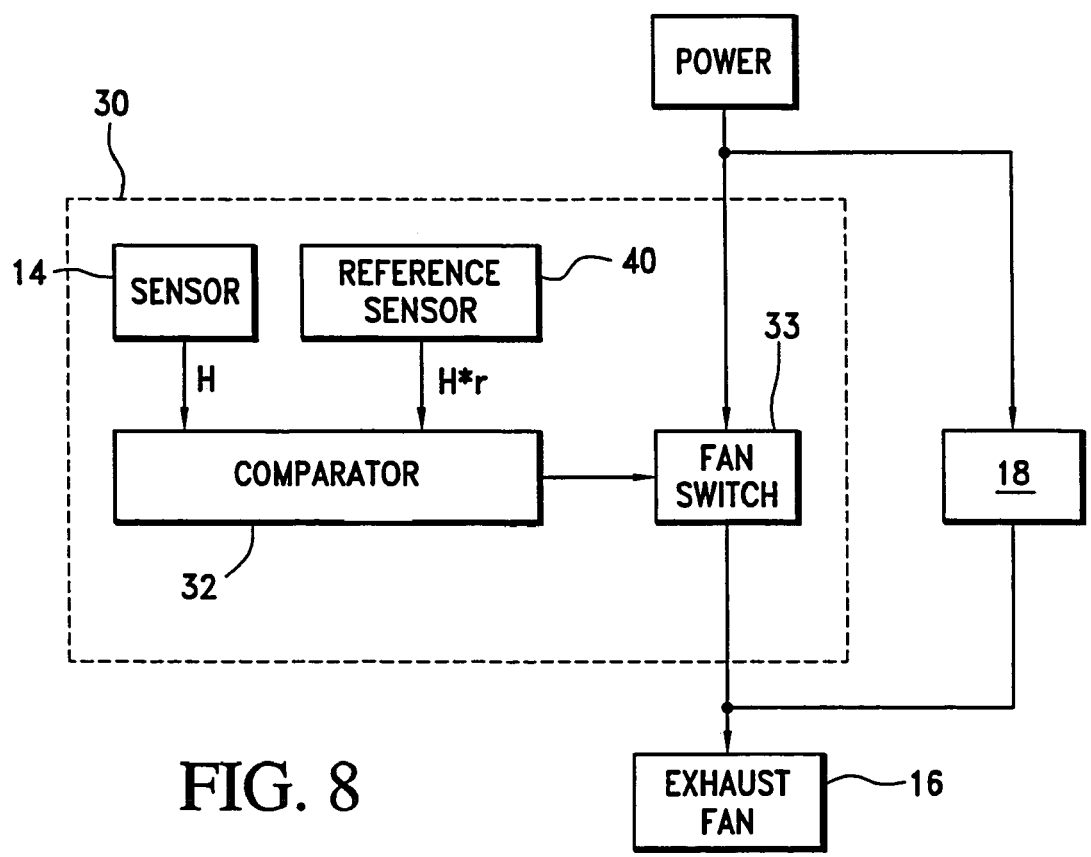
FIG. 8 is a block diagram of the control logic used in the ventilation system, in accordance with one embodiment of the present invention.

FIG. 8 is a block diagram of the control logic used in the ventilation system 10, in accordance with one embodiment of the present invention. The control logic used by integrated circuit 30 in a multiple humidity sensor 14, 40 system. As described above, signals H and H*r are provided by humidity sensor 14 and reference sensor 40, respectively. A comparator 32 continuously monitors both signals. As the humidity in the room increases, humidity sensor 14 sends a signal value H that exceeds the reference signal H*r from reference sensor 40. When H exceeds H*r, comparator 32 provides a signal to electric fan switch 33. Upon receipt of the signal, electric fan switch 33 switches on power to exhaust fan 16.

As above, it should be apparent to one skilled in the art that reference sensor 40 and/or humidity sensor 14 may be in wireless communication with ventilation controller 12. Wireless communication facilitates locating reference sensor 40 in another room, which would provide a more accurate measurement of the ambient humidity relative to placing reference sensor 40 within ventilation controller 12. However, the latter option is more cost effective. It should also be apparent that reference sensor 40 could be located in a nearby room while remaining in wired contact with the controller.

Figure 9:
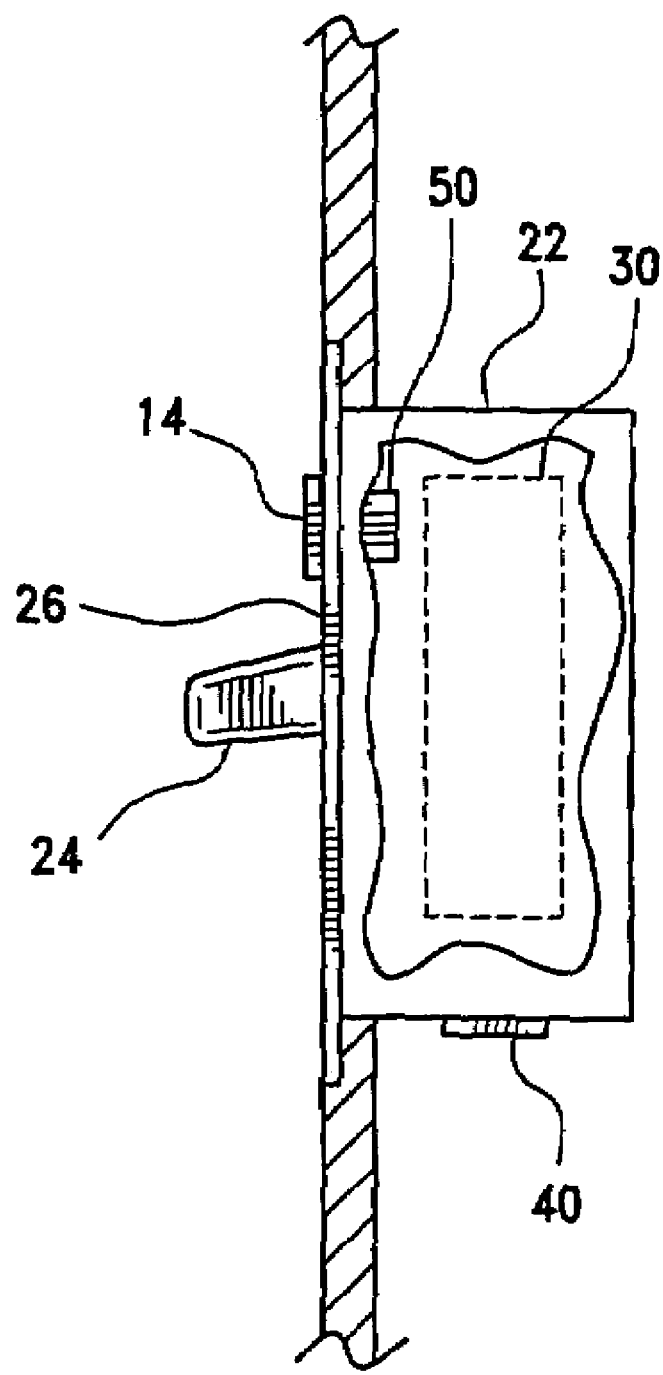
FIG. 9 is a ventilation controller including a heat source, in accordance with one embodiment of the present invention.

FIG. 9 is a ventilation controller 12 including a heat source 50, in accordance with one embodiment of the present invention. The heat source 50 could be a small heater, a heat sink connected to integrated circuit 30, or the like. Heat source 50 would prevent condensation from forming on either a humidity sensor on switch faceplate 26 or a reference sensor located within, or near, ventilation controller 12. It should be apparent that reference sensor 40 could be located on the exterior of ventilation controller 12 but within the wall space of the room being monitored. In such dark and potentially damp conditions, heat source 50 prevents condensation and/or mold growth that may impair a sensor's performance. It is possible to activate heat source 50 by a variety of means, including a manual button (not shown) on the faceplate, but, preferably, it would be activated only when integrated circuit 30 determines exhaust fan 16 is to be activated.

Overall, a significant improvement is realized in constructing the ventilation controller housing for mounting within, or in place of, a standard electrical junction box, such as a light and/or fan switch box. Housing 22 provides electrical connections (not shown) that allow ventilation controller 12 to be tied into a building's power supply and connected to existing exhaust fans. This construction provides the greatest convenience for retrofitting ventilation controller 12 into an existing ventilation system. The housing 22 may contain either an electrical or a mechanical humidity controller to improve upon such systems. However, the options of single or multiple sensors, with or without wireless communication, maximize the flexibility of ventilation system 10 to be installed in a variety of circumstances. Those skilled in the art should appreciate the value of adding temperature sensors (not shown), in conjunction with any humidity sensors, in order to more accurately determine the humidity of a room. Importantly, the various logic controls employed by the integrated circuit could be combined. Therefore, a user could provide a threshold value for comparison to a reference value, a gradient value could be compared to a reference value, a gradient value could be compared to a user set value, and the like.

Figure 10:
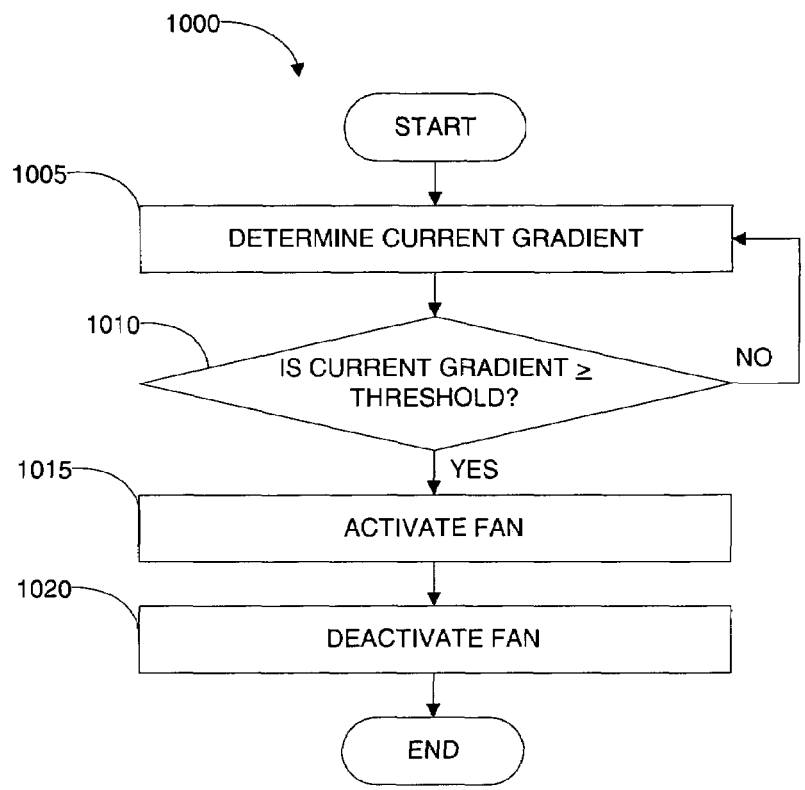
FIG. 10 is a flowchart diagram that illustrates the method operations performed in controlling the humidity, in accordance with one embodiment of the present invention.

FIG. 10 is a flowchart diagram that illustrates the method operations 1000 performed in controlling the humidity, in accordance with one embodiment of the present invention. In an operation 1005, the current humidity gradient is determined. The current humidity gradient can be determined in several different manners as will be described in more detail herein. The current humidity gradient can also be stored in the memory 34 of the ventilation controller 12.

In an operation 1010, the current gradient is compared to a threshold gradient. If the current gradient is less than the threshold gradient, then the method operations continue in operation 1005 above. However, if the current gradient is greater than or equal to the threshold gradient, then the method operations continue in operation 1015 below.

In an operation 1015, the fan 16 is automatically activated and in an operation 1020, the fan 16 is automatically deactivated. The method operations can then end or repeat in operation 1005 as described above.

Figure 11:
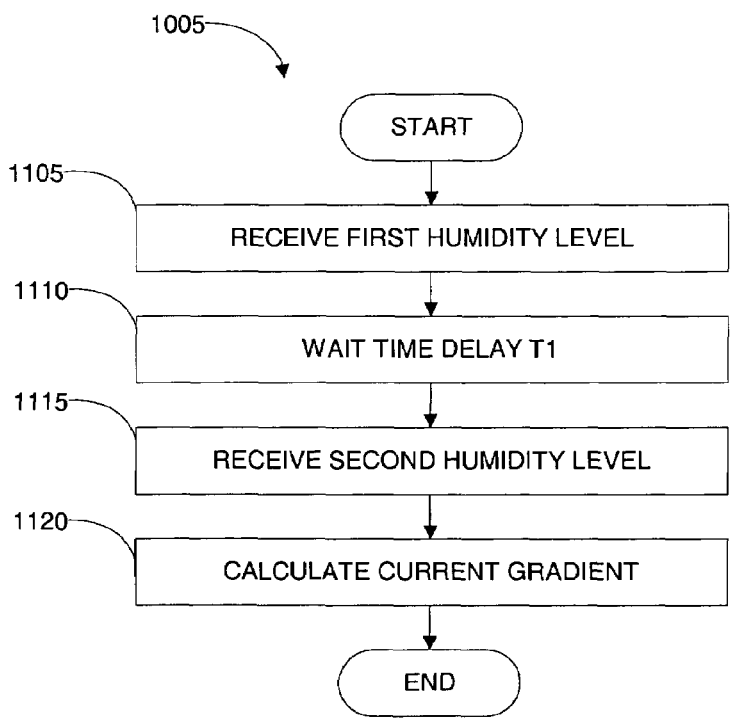
FIG. 11 is a flowchart diagram that illustrates the method operations performed in determining the current gradient, in accordance with one embodiment of the present invention.

FIG. 11 is a flowchart diagram that illustrates the method operations 1005 performed in determining the current gradient, in accordance with one embodiment of the present invention. In an operation 1105, a first humidity level Ho is received in the ventilation controller 12. The first humidity level can be recorded (e.g., stored) in a memory 34 portion of the ventilation controller 12. Once the first humidity level is received, a time delay T1 occurs in an operation 1110. Time delay T1 has a duration equal to t. By way of example, time delay T1 can have a duration t of between less than about 10 seconds and greater than about 10 minutes or even more (e.g., several hours).

In an operation 1115, a second humidity level Ht is received in the ventilation controller 12. The second humidity level can be recorded (e.g., stored) in a memory 34 portion of the ventilation controller 12.

In an operation 1120, the then current gradient is calculated. The current gradient is equal to a ratio of the change in humidity compared to the change in time. By way of example, the current gradient can be equal to $(Ht-Ho)/t$. It should be understood that the current gradient can also be determined as the inverse of $(Ht-Ho)/t$ (i.e., the change in time compared to the change in humidity).

Figure 12A:
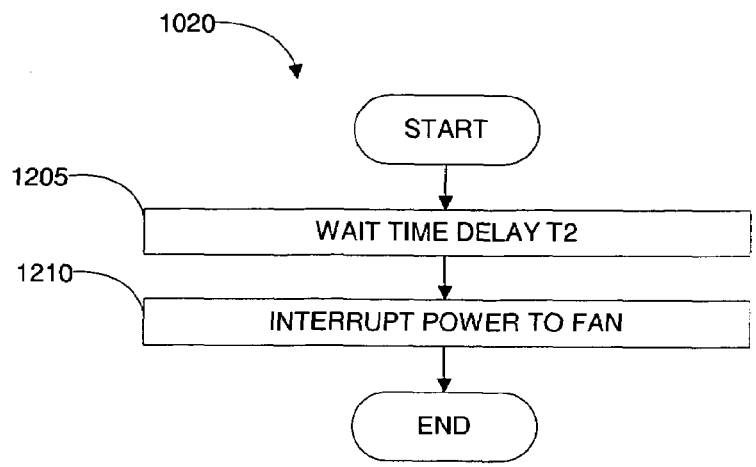
FIG. 12A is a flowchart diagram that illustrates the method operations performed in deactivating the fan, in accordance with one embodiment of the present invention.

FIG. 12A is a flowchart diagram that illustrates the method operations 1020 performed in deactivating the fan, in accordance with one embodiment of the present invention. In an operation 1205, a time delay T2 occurs and in operation 1210, power to the fan 16 is interrupted to deactivate the fan. Time delay T2 can be the same or different time interval than time delay T1 described above. Time delay T2 can be between about 10 seconds an about 10 minutes or even more (e.g., several hours).

Figure 12B:
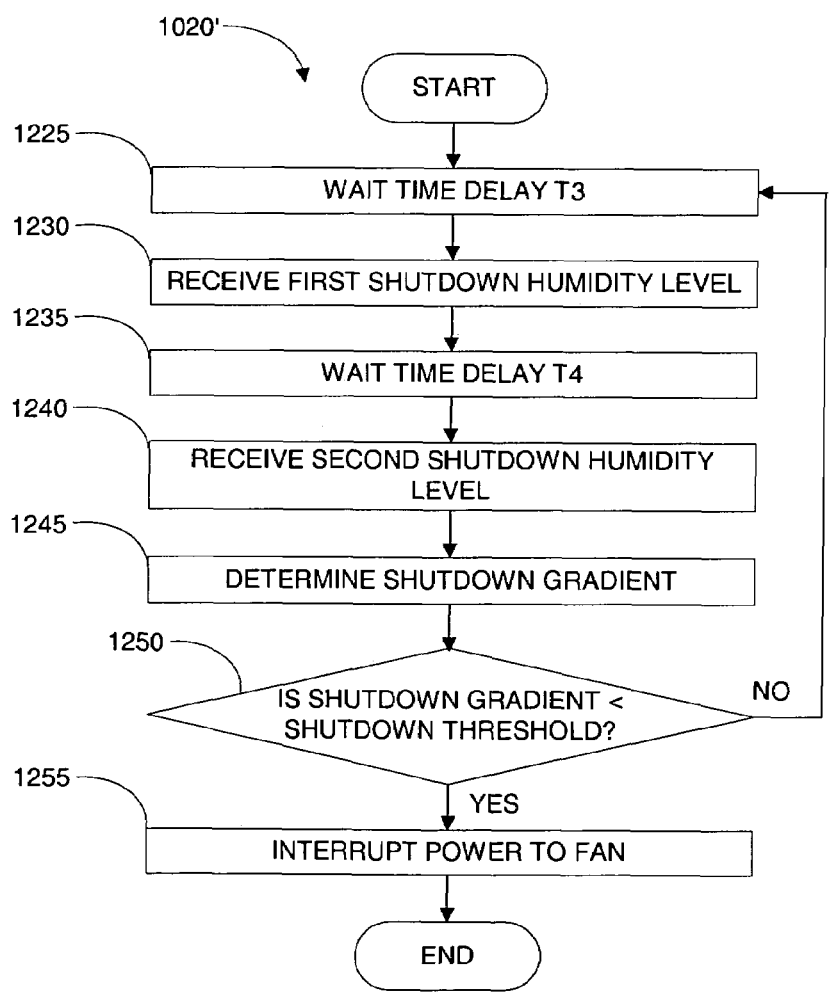
FIG. 12B is a flowchart diagram that illustrates the method operations performed in deactivating the fan, in accordance with one embodiment of the present invention.

FIG. 12B is a flowchart diagram that illustrates the method operations 1020' performed in deactivating the fan, in accordance with one embodiment of the present invention. In an operation 1225, a time delay T3 occurs. Time delay T3 can be between about 10 seconds an about 10 minutes or even more (e.g., several hours). Time delay T3 can be the same as or different time interval than time delay T2 described above.

In an operation 1230, a first shutdown humidity level Hsd1 is received and in an operation 1235, a time delay T4 occurs. Time delay T4 can be between about 10 seconds an about 10 minutes or even more (e.g., several hours).

In an operation 1240, a second shutdown humidity level Hsd2 is received. In an operation 1245, the first shutdown humidity level and the second shutdown humidity level are used to determine a shutdown gradient. The shutdown gradient=$(Hsd2-Hsd1)/T4$.

In an operation 1250, the shutdown gradient is compared to a shutdown threshold. The shutdown threshold is the threshold for shutting down (i.e., deactivating) the fan 16. The shutdown threshold is substantially similar to and can be determined in substantially similar methods as the threshold described elsewhere herein. If the shutdown gradient is greater than or equal to the shutdown threshold, then the method operations continue in operation 1225 above. Alternatively, if the shutdown gradient is less than the shutdown threshold, then the method operations continue in operation 1255. In an operation 1255, power to the fan 16 is interrupted to deactivate the fan.

Figure 13:
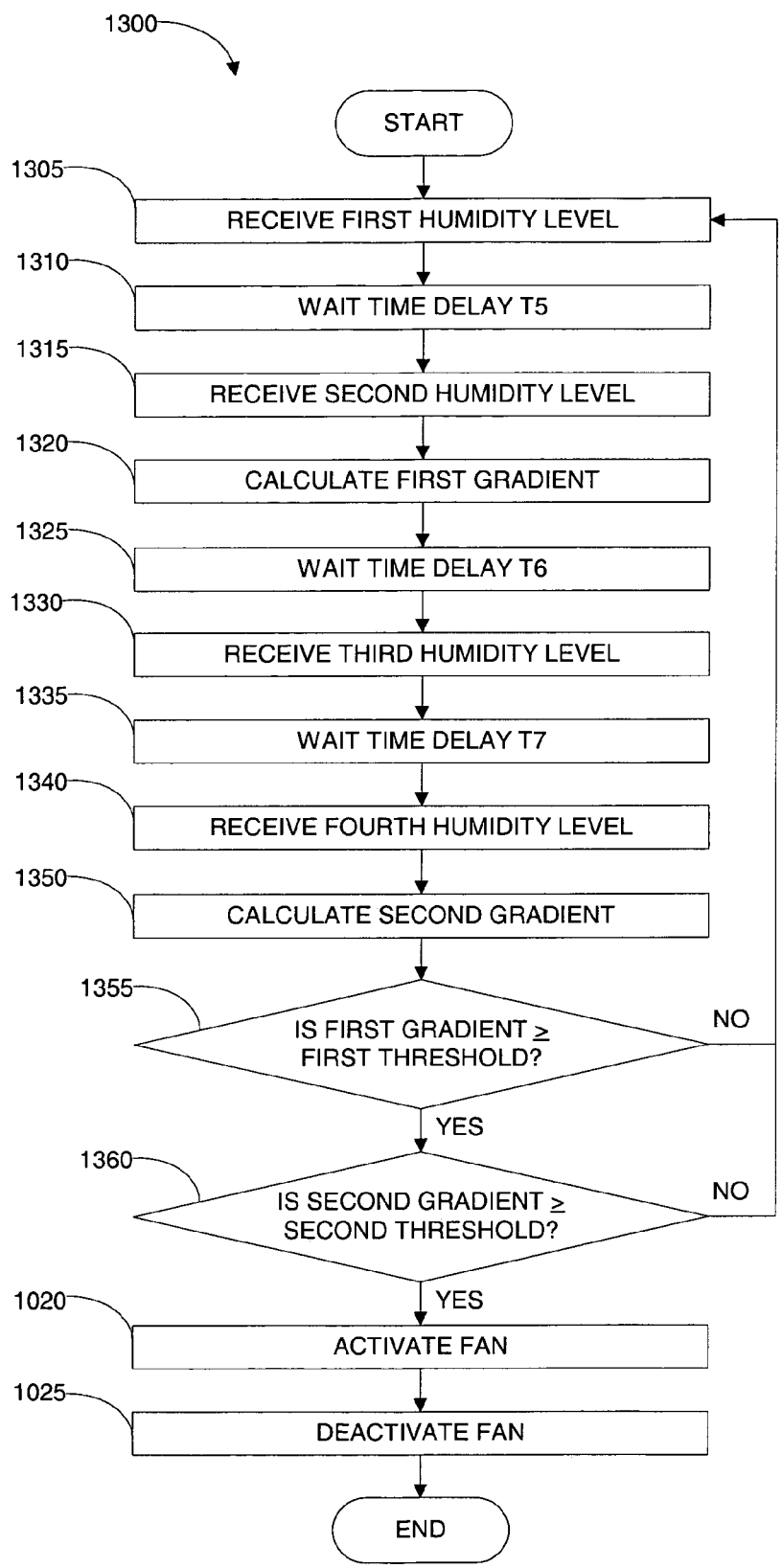
FIG. 13 is a flowchart diagram that illustrates the method operations performed in controlling the humidity, in accordance with one embodiment of the present invention.

FIG. 13 is a flowchart diagram that illustrates the method operations 1300 performed in controlling the humidity, in accordance with one embodiment of the present invention. In an operation 1305, a first humidity level H1 is received in the ventilation controller 12. Once the first humidity level is received, a time delay T5 occurs in an operation 1310. Time delay T5 can be between about 10 seconds an about 10 minutes or even more (e.g., several hours).

In an operation 1315, a second humidity level H2 is received in the ventilation controller 12. In an operation 1320, a first gradient is calculated. The first gradient=(H2−H1)/T5. The first gradient can also be stored in the memory 34 of the ventilation controller 12. Once the first gradient is calculated, a time delay T6 occurs in an operation 1325. Time delay T6 can be between about 10 seconds an about 10 minutes or even more (e.g., several hours).

In an operation 1330, a third humidity level H3 is received in the ventilation controller 12. Once the third humidity level is received, a time delay T7 occurs in an operation 1335. Time delay T7 can be between about 10 seconds an about 10 minutes or even more (e.g., several hours).

In an operation 1340, a fourth humidity level H4 is received in the ventilation controller 12. In an operation 1345, a second gradient is calculated. The second gradient= (H4−H3)/T7. The second gradient can also be stored in the memory 34 of the ventilation controller 12. In an alternative embodiment, operations 1335 and 1340 can be optional and the second gradient could therefore be calculated as (H3−H2)/T6.

In an operation 1355, the first gradient is compared to a first threshold gradient. If the first gradient is less than the first threshold gradient, then the method operations continue in operation 1305 above. However, if the first gradient is greater than or equal to the first threshold gradient, then the method operations continue in operation 1360 below.

In an operation 1360, the second gradient is compared to a second threshold gradient. If the second gradient is less than the second threshold gradient, then the method operations continue in operation 1305 above. However, if the second gradient is greater than or equal to the second threshold gradient, then the method operations continue in operations 1020 and 1025 as described in FIG. 10 above. The first threshold gradient and the second threshold gradient can have equal or different values.

Figure 14A:
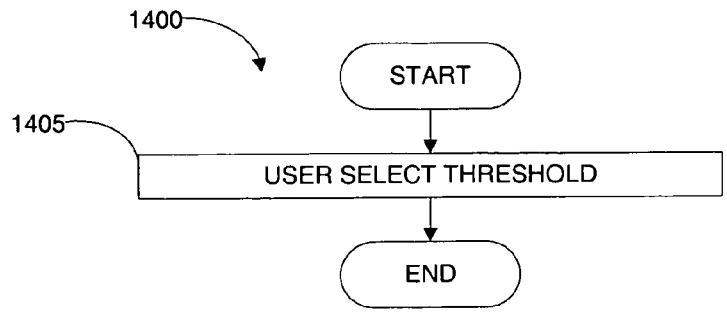
FIG. 14A is a flowchart diagram that illustrates the method operations performed in determining the threshold, in accordance with one embodiment of the present invention.

The threshold level can be a pre-selected value set by the manufacturer of the ventilation controller 12. Alternatively, the threshold level can be determined while the ventilation controller 12 is in use. By way of example, the threshold level can be an exponential constant moving average humidity level of a pre-selected time interval. By way of example the exponential average humidity level of the previous 24-hour time interval can be used as the threshold value. Similarly, the threshold value can be determined from stored and/or measured humidity levels and/or humidity gradients. The stored and/or measured humidity levels and/or humidity gradients can be in the form of a function curve including at least one of a linear, non-linear, piecewise linear, piecewise non-linear, or a combination of a linear and non-linear curves. FIG. 14A is a flowchart diagram that illustrates the method operations 1400 performed in determining the threshold, in accordance with one embodiment of the present invention. In an operation 1405, a user can manually select a threshold value. The user can manually select the threshold value by storing a threshold value in the memory 34 of the ventilation controller 12. Alternatively, the user can manually select the threshold value by adjusting a potentiometer or other similar input device.

Figure 14B:
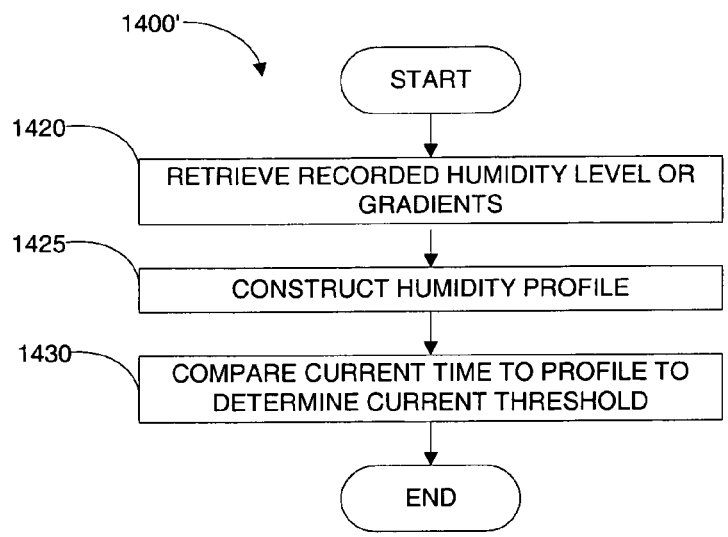
FIG. 14B is a flowchart diagram that illustrates the method operations performed in determining the threshold, in accordance with one embodiment of the present invention.

FIG. 14B is a flowchart diagram that illustrates the method operations 1400' performed in determining the threshold, in accordance with one embodiment of the present invention. In an operation 1420, the stored humidity levels (or gradient levels) for a given time interval are retrieved from memory 34. By way of example, the stored humidity levels for the previous 24 hours can be retrieved.

Figure 14C:
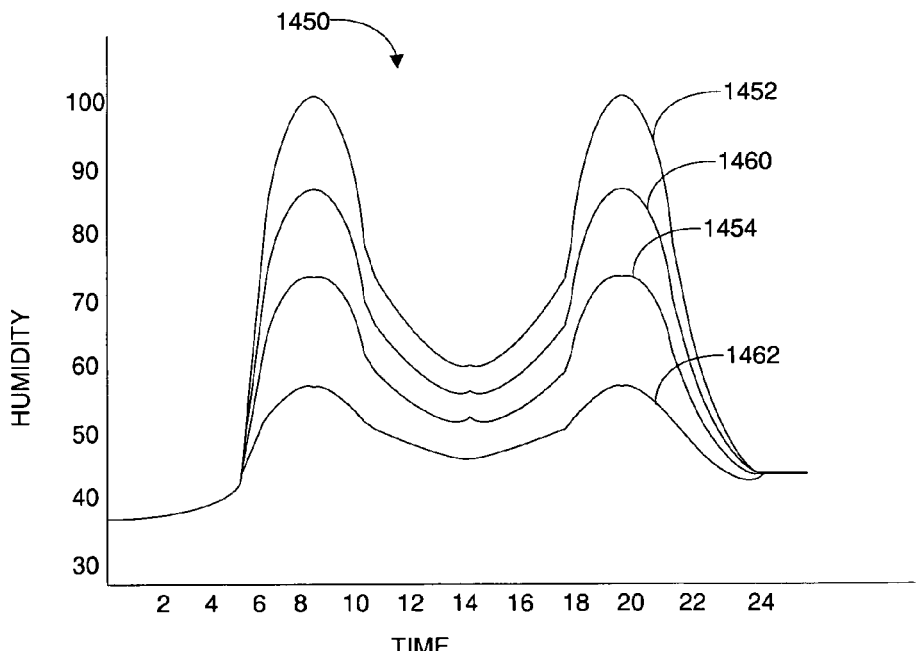
FIG. 14C is a graphical representation of an exemplary humidity profile, in accordance with one embodiment of the present invention.

In an operation 1425, a humidity profile is constructed. FIG. 14C is a graphical representation of an exemplary humidity profile 1450, in accordance with one embodiment of the present invention. The humidity profile 1450 compares the humidity level on the y-axis over a time interval of 24 hours, shown on the x-axis. As shown by humidity profile 1450, the humidity peaks at about hour 8 and again at about hour 20.

The humidity profile 1450 can also include multiple time intervals superimposed on one another. By way of example, graph 1452 represents the humidity profile for a first 24-hour time interval. Similarly, graph 1454 represents the humidity profile for a second 24-hour time interval.

The humidity profile 1450 can also include an average humidity profile 1460. The average humidity profile 1460 is the average of the previously recorded humidity profiles. By way of example, graph 1460 represents an average humidity profile for the first 24-hour time interval and the second 24-hour time interval (e.g., the average of graphs 1452 and 1454.

Referring again to FIG. 14B above, in an operation 1430, the current time is compared to the humidity profile to determine a current threshold. By way of example, for an hour 10 in the time interval, the average humidity scales at approximately 80. The threshold can be calculated as an offset from the average humidity. By way of example, the threshold can be calculated by reducing the average humidity by a scale of 30. Alternatively, the threshold can be calculated by reducing the scaling average humidity by a percentage. By way of example, the threshold graph 1462 is approximately equal to 60% of the average humidity 1460.

It should be understood that while the humidity profile has been described in terms of a 24-hour time interval profile, the humidity profile can have a time interval shorter or a longer than 24 hours (e.g., between less than about 1 hour to more than about 30 days). By way of example, the time interval can be about 7 days (e.g., one week).

Figure 15B:
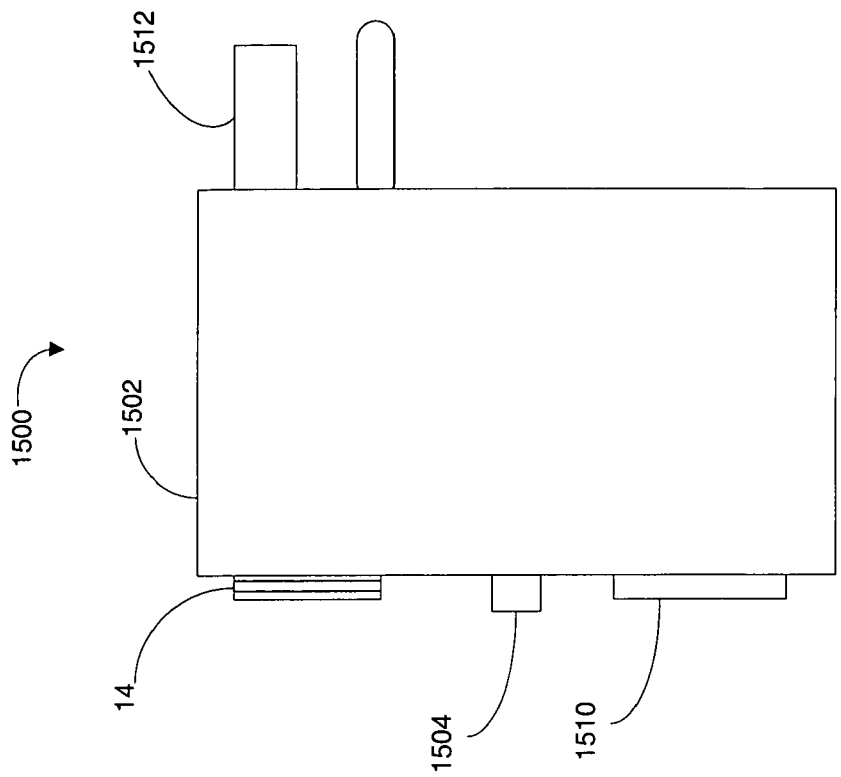
FIGS. 15A and 15B illustrate a ventilation controller, in accordance with one embodiment of the present invention.
Figure 15A:
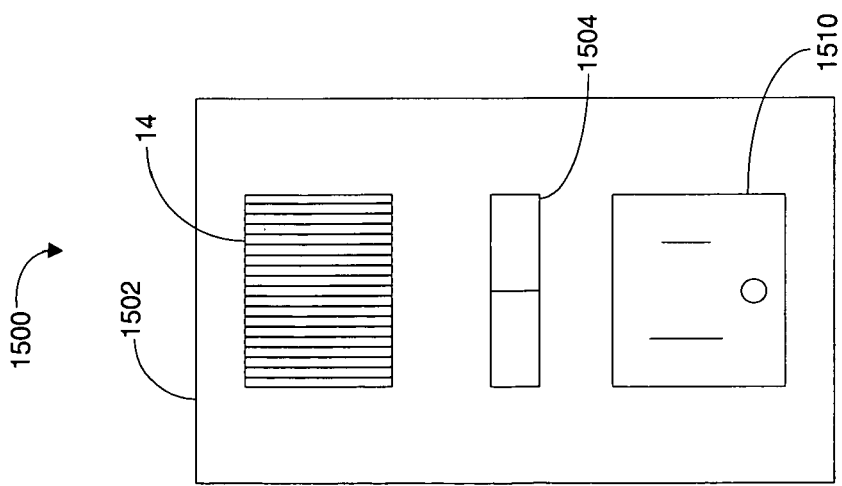

FIGS. 15A and 15B illustrate a ventilation controller 1500, in accordance with one embodiment of the present invention. The ventilation controller 1500 is substantially similar to the ventilation controller 12 described above. The ventilation controller 1500 is enclosed in a housing 1502. The housing 1502 includes the humidity sensor 14, an optional switch 1504 and an electrical plug 1512 suitable for connection to a standard electrical socket. It should be understood that while the electrical plug 1512 shown is a standard 110 volt/60 cycle electrical plug as used in the United States, the electrical plug 1512 can be a 220 volt/50 cycle, 220 volt/60 cycle, 440 volt/50 cycle, 440 volt/60 cycle, or single or multiple phase electrical plug.

The housing 1502 also includes an electrical receptacle 1510. Power to the electrical receptacle 1510 is switched according to the humidity level detected by the humidity sensor 14 as described above. In operation, the electrical plug 1512 is coupled to a standard electrical outlet and the fan 16 is connected to the electrical receptacle 1510. In this manner the electrical power is received through the electrical plug 1512 and switched by the ventilation controller as described in more detail above. The switched electrical power is applied to the fan 16 through the electrical receptacle 1510.

Figure 16B:
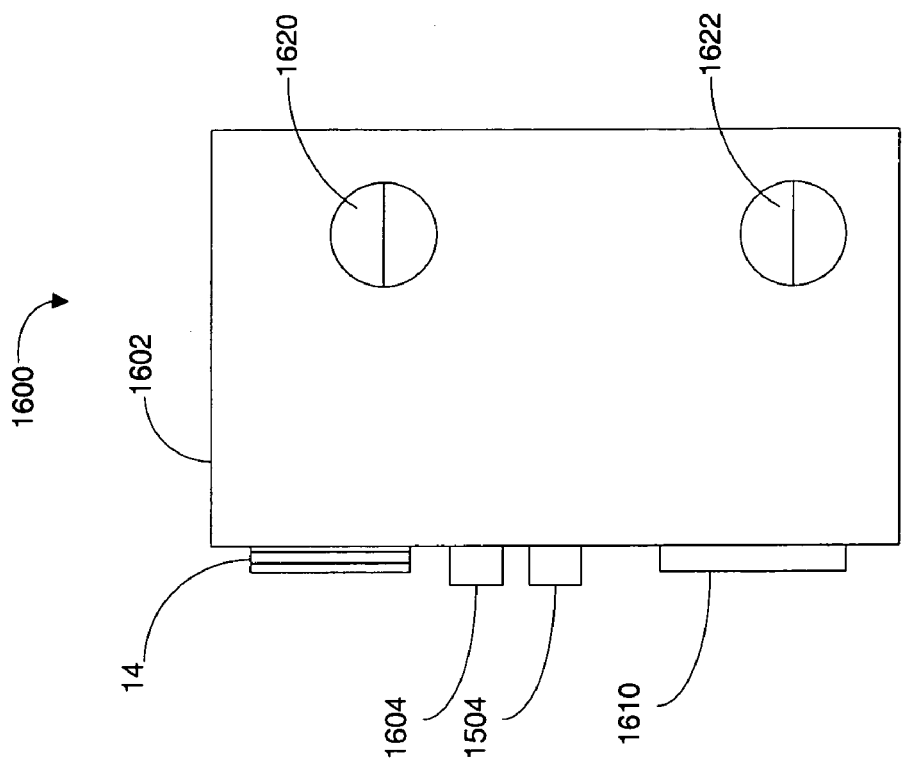
FIGS. 16A and 16B illustrate a ventilation controller, in accordance with one embodiment of the present invention.
Figure 16A:
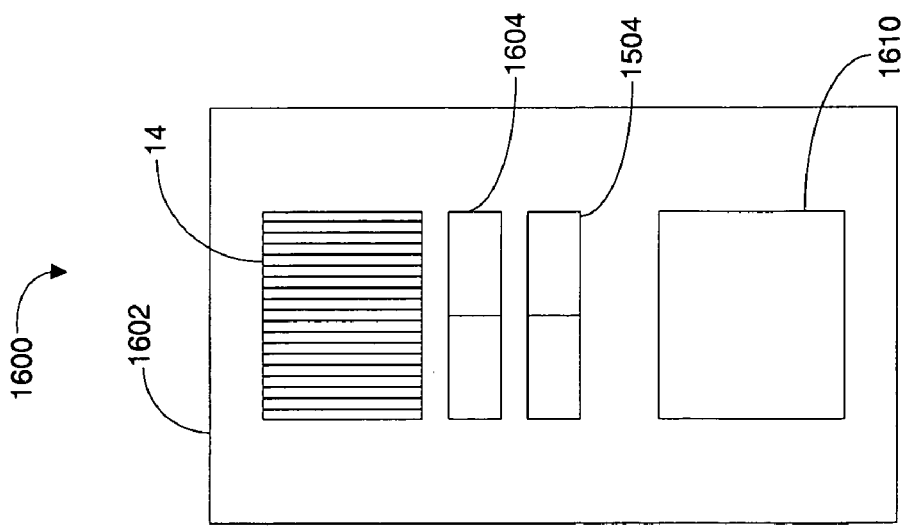

FIGS. 16A and 16B illustrate a ventilation controller 1600, in accordance with one embodiment of the present invention. The ventilation controller 1600 is substantially similar to the ventilation controller 12 described above. The ventilation controller 1600 is enclosed in a housing 1602 and includes an input/output device 1610, a light switch 1604, a fan switch 1604 and a humidity sensor 14.

The housing 1602 includes two or more openings 1620, 1622 (e.g., knockouts or similar openings). The openings 1620, 1622 can be used to provide access for electrical wiring into and out of the housing 1602. By way of example, electrical power can be provided through opening 1620 and switched electrical power can be provided through opening 1622. The light switch 1604 can be used to provide switched electrical power to an external light source coupled to the ventilation controller 1600 through at least one of the openings 1620, 1622.

The input/output device 1610 can include any one or more of a motion sensor, a night light, a light sensor, timer, fragrance dispenser, a display or a speaker. By way of example, a night-light can illuminate the light switch 1604 so that a user can more easily find the light switch 1604 in the dark. In another example, the motion sensor can provide an input to the ventilation controller 1600 to automatically provide power to a light, a fan or other device coupled to the ventilation controller. The timer can be used to provide a timed functionality to any device coupled to the ventilation controller 1600. A fragrance dispenser can dispense fragrance such as whenever the ventilation controller 1600 is activated (e.g., a light is on or a fan is on) or periodically throughout the day. A speaker can be used to provide audio such as from an external audio source (e.g., a radio, intercom, MP3 player, etc.).

A display can be used to indicate the status of the ventilation controller 1600. By way of example the display can display a current temperature or humidity or a time or a timer function or any other use that can be displayed by the display. The display can be a liquid crystal display (LCD) or a light emitting diode (LED) display or similar display device. By way of example a multi-colored LED display can be used. Each color can indicate a different status. By way of example a green can indicate a monitoring status, a yellow can indicate humidity rising or rising above the threshold, a red can indicate power is provided to the fan and/or light or other device coupled to the ventilation controller 1600.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of controlling ventilation comprising:
   determining a current gradient including:
      receiving a first humidity level from a humidity sensor in communication with a ventilation controller;
      waiting a first time delay;
      receiving a second humidity level from the humidity sensor; and
      calculating a first gradient based on a first humidity difference, wherein the first humidity difference is a difference between the second humidity level and the first humidity level, wherein the current gradient is based on the first gradient;
   comparing the current gradient to a threshold gradient; and
   activating a device coupled to a ventilation controller if the current gradient is greater than or equal to the threshold gradient.

2. The method of claim 1, wherein the ventilation controller includes a housing including:
   a circuit for electrically connecting a power source to the ventilation controller;
   at least one switch in the housing; and
   at least one humidity sensor in communication with, and providing data to, the ventilation controller.

3. The method of claim 1, wherein the ventilation controller includes at least one of a display, an electrical receptacle, a speaker, a motion detector, a light or a fragrance dispenser.

4. The method of claim 1, wherein the device includes at least one of a fan or a light.

5. The method of claim 1, wherein the current gradient is equal to the first gradient.

6. The method of claim 1, wherein determining the current gradient further includes:
waiting a second time delay from receiving the second humidity level;
receiving a third humidity level; and
calculating a second gradient based on a second humidity difference wherein the second humidity difference is a difference between the third humidity level and the second humidity level, wherein comparing the first gradient to the first threshold gradient further includes comparing the second gradient to a second threshold gradient if the first gradient is greater than or equal to the first threshold gradient.

7. The method of claim 1, wherein determining a current gradient further includes:
receiving a third humidity level;
waiting a second time delay;
receiving a fourth humidity level; and
calculating a second gradient based on a second humidity difference, wherein the second humidity difference is a difference between the fourth humidity level and the third humidity level, wherein comparing the first gradient to the first threshold gradient further includes comparing the second gradient to a second threshold gradient if the first gradient is greater than or equal to the first threshold gradient.

8. The method of claim 1, wherein the threshold gradient includes a pre-selected threshold gradient.

9. The method of claim 1, wherein the threshold gradient includes retrieving a plurality of recorded humidity levels over a time interval.

10. The method of claim 9, wherein the time interval includes a plurality of time intervals and wherein the plurality of recorded humidity levels includes retrieving a plurality of recorded humidity levels in each of the plurality of time intervals and wherein determining an average humidity level includes constructing a humidity profile.

11. The method of claim 1, wherein comparing the current gradient to the threshold gradient includes determining an average humidity level gradient, wherein the threshold gradient is based on the average humidity level gradient.

12. The method of claim 1, wherein comparing the current gradient to the threshold gradient includes determining the threshold gradient from at least one of a linear curve, non-linear curve, piecewise linear curve, piecewise non-linear curve, or a combination of a linear curve and non-linear curve.

13. The method of claim 1, further comprising deactivating the device.

14. The method of claim 13, wherein deactivating the device includes:
waiting a first shutdown time delay; and
interrupting power to the device.

15. A method of controlling ventilation comprising:
receiving a first humidity level;
waiting a first time delay;
receiving a second humidity level;
calculating a first gradient based on a first humidity difference divided by the first time delay, wherein the first humidity difference is a difference between the second humidity level and the first humidity level;
receiving a third humidity level;
waiting a second time delay;
receiving a fourth humidity level;
calculating a second gradient based on a second humidity difference divided by the second time delay, wherein the second humidity difference is a difference between the fourth humidity level and the third humidity level;
comparing the first gradient to a first threshold gradient;
comparing the second gradient to a second threshold gradient if the first gradient is greater than or equal to the first threshold gradient; and
activating a device coupled to the ventilation controller if the second gradient is greater than or equal to the second threshold gradient.

16. A ventilation system comprising:
an exhaust fan; and
a ventilation controller contained within a housing, the housing including:
a first humidity sensor being exposed to at least one external surface of the housing;
the ventilation controller coupled to the exhaust fan and including:
logic for determining a current gradient including:
logic for receiving a first humidity level from a humidity sensor in communication with a ventilation controller;
logic for waiting a first time delay;
logic for receiving a second humidity level from the humidity sensor; and
logic for calculating a first gradient based on a first humidity difference, wherein the first humidity difference is a difference between the second humidity level and the first humidity level, wherein the current gradient is based on the first gradient;
logic for comparing the current gradient to a threshold gradient; and
logic for activating the exhaust fan if the current gradient is greater than or equal to the threshold gradient.

17. The system of claim 16, further comprising at least one switch, the at least one switch including a manual switch, the manual switch operable to bypass the ventilation controller.

18. The system of claim 16, wherein-the current gradient is equal to the first gradient.

19. The system of claim 16, wherein the logic for determining the current gradient further includes:
logic for waiting a second time delay from receiving the second humidity level;
logic for receiving a third humidity level; and
logic for calculating a second gradient based on a second humidity difference, wherein the second humidity difference is a difference between the third humidity level and the second humidity level.

20. The system of claim 19, wherein the logic for comparing the first gradient to the first threshold gradient further includes logic for comparing the second gradient to a second threshold gradient if the first gradient is greater than or equal to the first threshold gradient.

21. The system of claim 16, wherein the logic for determining a current gradient further includes:
logic for receiving a third humidity level;
logic for waiting a second time delay;

logic for receiving a fourth humidity level; and
logic for calculating a second gradient based on a second humidity difference, wherein the second humidity difference is a difference between the fourth humidity level and the third humidity level.

22. The system of claim 21, wherein the logic for comparing the first gradient to the first threshold gradient includes logic for comparing the second gradient to a second threshold gradient if the first gradient is greater than or equal to the first threshold gradient.

* * * * *